US012280555B1

(12) United States Patent
Sibbach et al.

(10) Patent No.: US 12,280,555 B1
(45) Date of Patent: Apr. 22, 2025

(54) AUTOMATED FIBER PLACEMENT ASSEMBLY AND METHOD FOR FORMING A COMPONENT

(71) Applicant: GENERAL ELECTRIC COMPANY, Schenectady, NY (US)

(72) Inventors: Arthur William Sibbach, Boxford, MA (US); Nicholas Joseph Kray, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/484,510

(22) Filed: Oct. 11, 2023

(51) Int. Cl.
  *B29C 70/38* (2006.01)
  *B29C 70/54* (2006.01)
  *B29L 31/00* (2006.01)

(52) U.S. Cl.
  CPC .......... *B29C 70/384* (2013.01); *B29C 70/545* (2013.01); *B29L 2031/7504* (2013.01)

(58) Field of Classification Search
  CPC .................................................. B29C 70/384
  See application file for complete search history.

(56) References Cited

U.S. PATENT DOCUMENTS

| | | | |
|---|---|---|---|
| 4,285,752 A * | 8/1981 | Higgins | B29C 70/388 226/110 |
| 8,282,758 B2 | 10/2012 | Van Nieuwenhove et al. | |
| 8,327,743 B2 | 12/2012 | McCowin | |
| 8,522,849 B2 | 9/2013 | Van Nieuwenhove et al. | |
| 10,391,726 B2 | 8/2019 | Jeon | |
| 10,730,246 B2 | 8/2020 | Iwata et al. | |
| 11,007,675 B2 | 5/2021 | Miyoshi et al. | |
| 11,458,694 B2 | 10/2022 | Nishimura et al. | |
| 11,518,116 B2 | 12/2022 | Samejima et al. | |
| 2019/0126573 A1 * | 5/2019 | Zivkovic | B26D 7/2628 |

FOREIGN PATENT DOCUMENTS

| | | |
|---|---|---|
| JP | 1909889 B2 | 2/1992 |
| WO | 2020249897 A1 | 12/2020 |

OTHER PUBLICATIONS

Boon et al., Recent Advances on the Design Automation for Performance-Optimized Fiber Reinforced Polymer Composite Components, Journal of Composites Science, May 29, 2020, vol. 4(2). 61, MDPI, www.mdpi.com/, Basel, Switzerland.

* cited by examiner

*Primary Examiner* — Jeffry H Aftergut
(74) *Attorney, Agent, or Firm* — McGarry Bair PC (57) ABSTRACT

An automated fiber placement assembly forms a component by the placement of separate or multiple layers of fiber tows. The automated fiber placement assembly comprises a cutter assembly defining a cut shape. A backplate is spaced from the first cutter assembly against which cutter assembly can cut the fiber tows. The fiber tows define a longitudinal axis and are fed between the first cutter assembly and the backplate in a feed direction. The cutter head assembly is rotatable and movable to vary the orientation of the cutter assembly in order to define different cut shapes non-orthogonal to the longitudinal axis.

20 Claims, 8 Drawing Sheets

AUTOMATED FIBER PLACEMENT ASSEMBLY AND METHOD FOR FORMING A COMPONENT

TECHNICAL FIELD

The present disclosure relates generally to an automated fiber placement assembly for formation of a component or composite parts, and particularly, to a tool for cutting fibers during fiber placement during the formation of a component.

BACKGROUND

Many components, such as those for a turbine engine, are made from composite materials that can include a fiber-reinforced matrix and exhibit a high strength to weight ratio. Due to the high strength to weight ratio and moldability to adopt relatively complex shapes, composite materials are utilized in various applications. Components made from composite materials can be used in aviation applications, for example, such as forming at least a portion of the fuselage and/or wings, rudder, manifold, turbine engine, airfoil, blades, vanes or other components of the aircraft.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the disclosure herein are directed to a system and method for forming a component, such as a component for a turbine engine, or any other components that can be fully or partially formed by automated fiber placement (AFP) assemblies or machines. Automated fiber placement machines can be used to lay successive layers of fiber tows to build or add to a component. Components can include simple geometric shapes, but are often complex, and result in overhanging tow ends or less-than-ideal application of fiber tows resultant of the complex shapes of the component to be formed.

As described herein, the automated fiber placement assembly can be used to form components or apply fiber tows during the forming of components, such as engine components used in a turbine engine for an aircraft. Such engine components can be an airfoil, for example, such as for a fan blade. It should be understood that the disclosure can apply similarly to other components of the turbine engine, such as a combustor liner or a disk in non-limiting examples, as well as non-aircraft or non-engine components. While described in terms of a component for a turbine engine, it will be appreciated that the present disclosure can apply to any component and need not be specific to a turbine engine or aircraft.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The terms "fore" or "forward" mean in front of something and "aft" or "rearward" mean behind something. For example, when used in terms of fluid flow, fore/forward can mean upstream and aft/rearward can mean downstream.

The term "fluid" may be a gas or a liquid, or multi-phase.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) as may be used herein are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that those two elements are directly connected and in fixed relation to one another. The exemplary drawings are for purposes of illustration only and the dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

The term "composite," as used herein is, is indicative of a component having two or more materials. A composite can be a combination of at least two or more metallic, non-metallic, or a combination of metallic and non-metallic elements or materials. Examples of a composite material can be, but are not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to form the composite component or composite portion of a component having a predetermined weight, size, stiffness, and strength.

Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Additionally, as used herein, elements being "electrically connected," "electrically coupled," "communicatively coupled" or "in electrical communication", as well as terminology similar thereto, can include an electric, wired or wireless, transmission or signal being sent, received, or communicated to or from such connected or coupled elements. Furthermore, such electrical connections or couplings can include a wired or wireless connection, or a combination thereof.

One or more layers of adhesive can be used in forming or coupling composite components. Adhesives can include resin and phenolics, wherein the adhesive can cure at elevated temperatures or by other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create a number of stacked plies forming the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can include post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a predetermined chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds, and other like components, which would benefit from the lighter-weight and higher temperature capability these materials can offer.

The inventors' practice has proceeded in the foregoing manner of designing a system used in the manufacture of a component, and designing the system to have improved tow fiber application and cutting. This system is utilized during the design and creation of several different types of components, such as those utilized in the turbine engine shown in FIGS. 1 and 2.

Figure 1:
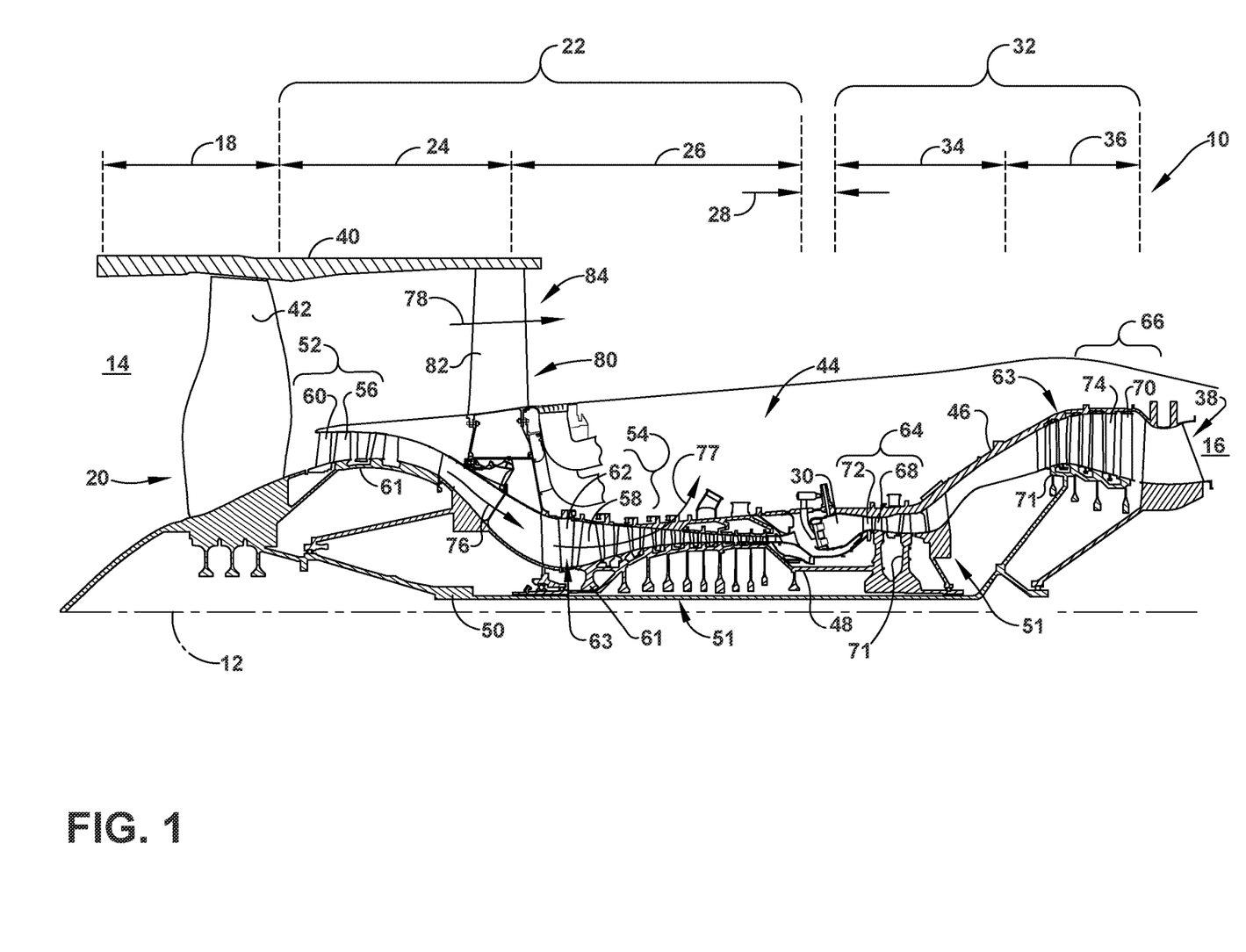
FIG. 1 is a schematic cross-sectional view of a turbine engine in accordance with an exemplary aspect of the present disclosure.

FIG. 1 is a schematic cross-sectional diagram of a turbine engine 10 for an aircraft. The turbine engine 10 has a generally longitudinally extending axis or engine centerline 12 extending from a forward 14 to an aft 16. The turbine engine 10 includes, in a downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the greater diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor 24, 26 can be mounted to (or integral to) a disk 61, which is mounted to the corresponding one of the HP and LP spools 48, 50. The static compressor vanes 60, 62 for a stage of the compressor 24, 26 can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine 34, 36 can be mounted to a disk 71, which is mounted to the corresponding one of the HP and LP spools 48, 50. The static turbine vanes 72, 74 for a stage of the compressor 24, 26 can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components for cooling. The temperature of pressurized airflow 76 entering the combustor 30 is significantly increased above the bleed air temperature. The bleed air 77 may be used to reduce the temperature of the core components downstream of the combustor 30.

A remaining portion of the pressurized airflow 76 bypasses the LP compressor 24 and engine core 44 as a bypass airflow 78 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
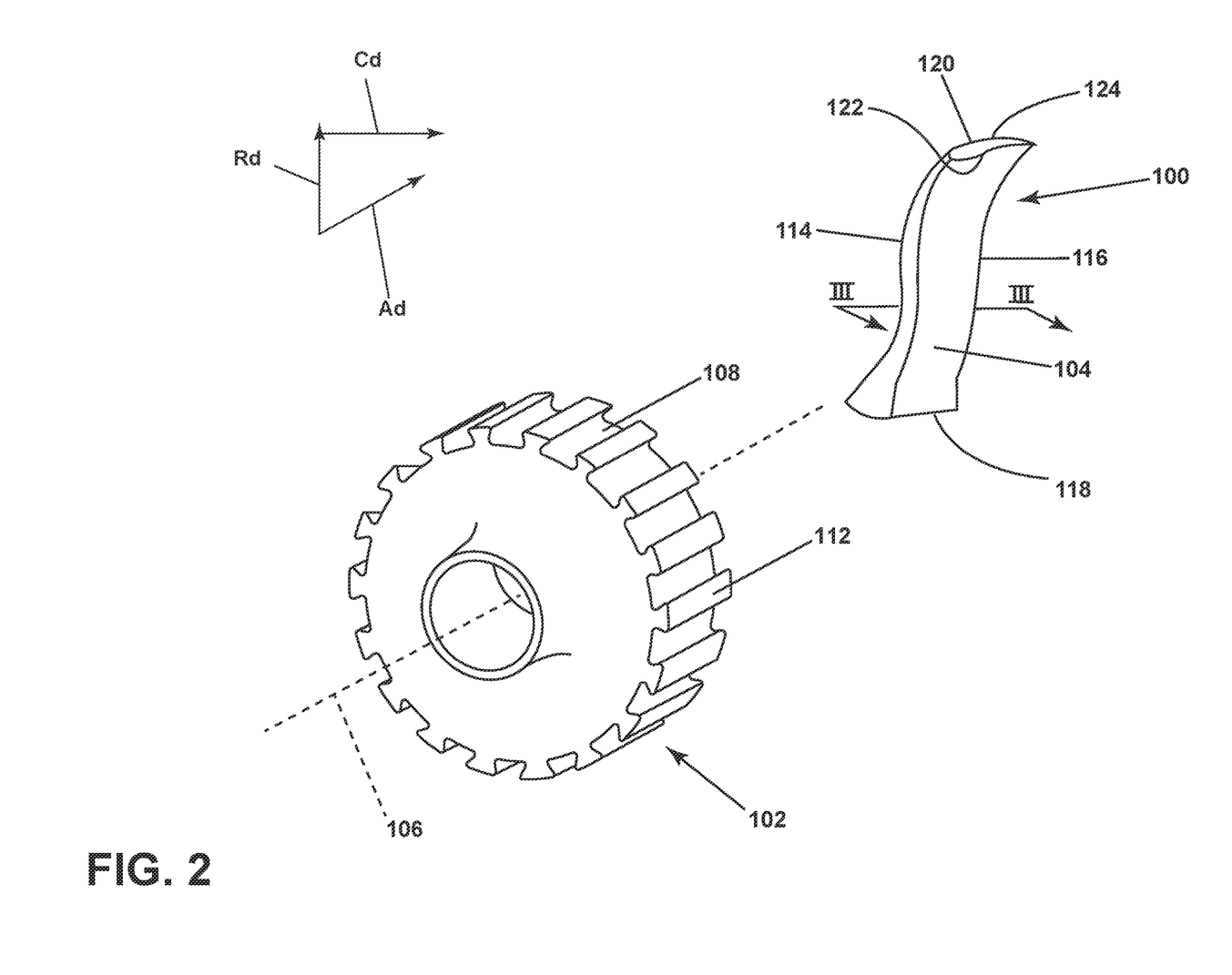
FIG. 2 is a schematic perspective view of a composite airfoil assembly and disk assembly suitable for use within the turbine engine of FIG. 1, in accordance with an exemplary aspect of the present disclosure.

FIG. 2 is a schematic perspective view of a composite airfoil 100 and a disk 102 suitable for use within the turbine engine 10 of FIG. 1. The composite airfoil 100 can define a body 104. The disk 102 is suitable for use as the disk 61, 71 (FIG. 1) or any other disk such as, but not limited to, a disk within the fan section 18 (FIG. 1), the compressor section 22 (FIG. 1), or the turbine section 32 (FIG. 1) of the turbine engine 10 (FIG. 1). The composite airfoil 100 can be rotating or non-rotating such that the composite airfoil 100 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil 100 can be a composite fan blade.

The composite airfoil 100, and the body 104 thereof, extends between a leading edge 114 and a trailing edge 116 to define a chord-wise direction, and extends between a root 118 and a tip 120 to define a span-wise direction. The composite airfoil 100 includes a pressure side 122 and a suction side 124.

The disk 102 can be rotatable or stationary about a rotational axis 106. The rotational axis 106 can coincide with, be parallel to, or be offset from the engine centerline 12 (FIG. 1). The disk 102 includes a plurality of slots 108 extending axially through a radially exterior surface 112 of the disk 102. The plurality of slots 108 are circumferentially spaced about the disk 102, with respect to the rotational axis 106, and permit the composite airfoil 100 to slidably secure to the disk 102.

The composite airfoil 100 couples to the disk 102 by inserting at least a portion of the composite airfoil 100 into a respective slot of the plurality of slots 108. The composite airfoil 100 is held in place by frictional contact with the slot 108 or can be coupled to the slot 108 via any suitable coupling method such as, but not limited to, welding, adhesion, fastening, or the like. While only a single composite airfoil 100 is illustrated, it will be appreciated that there can be any number of composite airfoils 100 coupled to the disk 102. As a non-limiting example, there can be a plurality of composite airfoil 100 corresponding to a total number of slots of the plurality of slots 108.

For the sake of reference, a set of relative reference directions, along with a coordinate system can be applied to the composite airfoil 100 and the disk 102. An axial direction (Ad) can extend from forward to aft and is shown extending at least partially into the page. The axial direction (Ad) and can be arranged parallel to the rotational axis 106, which can also be arranged parallel to the engine centerline 12 (FIG. 1). A radial direction (Rd) extends perpendicular to the axial direction (Ad), which can extend perpendicular to the engine centerline 12. A circumferential direction (Cd) can be defined perpendicular to the radial direction (Rd), which can be defined as a ray extending from a curvature or along a curvature of a circumference about the axial direction (Ad), can be defined as a ray extending locally from the radial direction (Rd), and/or can be defined along the circumference of the turbine engine 10 (FIG. 1) relative to the engine centerline 12 (FIG. 1) or rotational axis 106.

Figure 3:
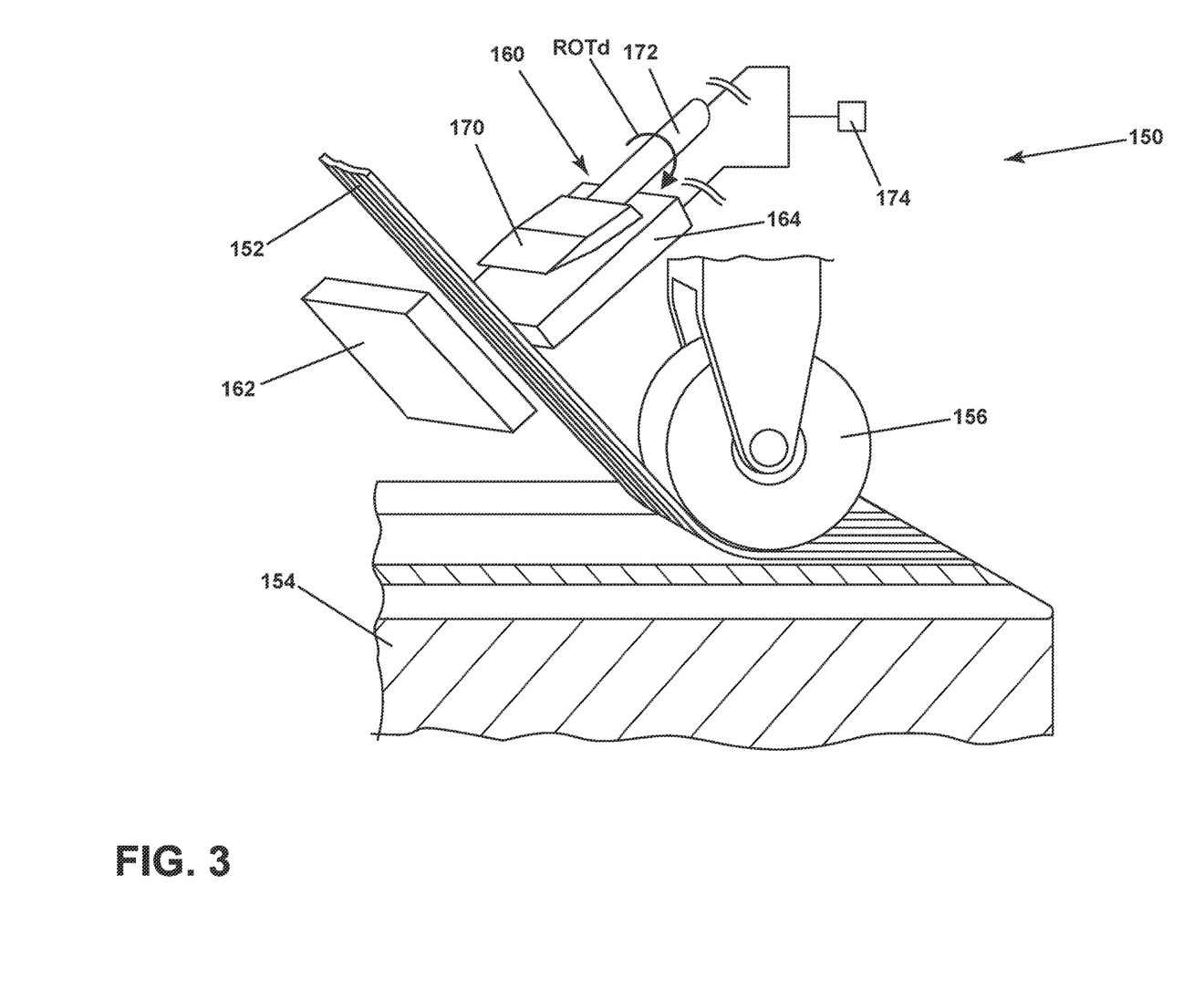
FIG. 3 is schematic perspective view of an automated fiber placement assembly with a cutter head assembly, in accordance with an exemplary aspect of the present disclosure.

FIG. 3 illustrates a schematic view of an automated fiber placement assembly 150 that applies a strip of fiber tows 152 to a component 154 at least partially forming the component 154. In one non-limiting example, the component 154 can be the composite airfoil 100 of FIG. 2, while non-turbine engine components are contemplated. As shown, the strip of fiber tows 152 includes five individual tows, while any number of tows forming the strip of fiber tows 152 is contemplated. A roller 156 is used to apply the strip of fiber tows 152 to the component 154 in a feed direction. Multiple layers of strips of fiber tows 152 can be applied in this manner in order to form the component.

A cutter head assembly 160, shown schematically in FIG. 3, is spaced from a backplate 162. The strip of fiber tows 152 are fed between the cutter head assembly 160 and the backplate 162 permitting cutting of the strip of fiber tows 152 to any length or position against the backplate 162. A vacuum 164 can be positioned behind, at, or adjacent to the cutter head assembly 160 in order to remove fiber tow trimmings resultant from the cutter head assembly 160 cutting the strip of fiber tows 152.

The cutter head assembly 160 includes a cutter head 170 coupled to an actuator 172 that actuates the cutter head 170 to cut the strip of fiber tows 152 against the backplate 162. In one example, the actuator 172 can include a fixed body and a moveable body, permitting actuation of the movable body relative to the fixed body. The fixed body can be a mount, for example, while the movable body can be movable by electric current, pressure, or other force generation. Additional movers comprising the actuator 172 can include linear motors or rotary motors, in non-limiting examples. The shape of the cutter head 170 defines a cut shape or cut pattern that is formed into the severed strip of fiber tows 152 after cutting is completed. The cutter head 170 can be removably attached to the actuator 172 permitting interchanging of the cutter head 170. The actuator 172 can move the cutter head 170, shown as moving in a rotating direction ROTd, to vary the orientation of the cutter head 170 relative to the strip of fiber tows 152. In this way, the cutter head assembly 160 can be used to cut the strip of fiber tows 152 at different orientations, discussed in further detail herein, and including those orientations including portions offset from orthogonal, or being arranged non-orthogonal, relative to the longitudinal extent of the strip of fiber tows 152.

The cutter head assembly 160, or other elements such as the vacuum 164, the actuator 172, or the roller 156, can be communicatively and operatively coupled to a controller 174. The controller 174 can include a memory for programming software or operational software, as well as a processor for performing tasks or running the software, for example. The controller 174 can be used to control operation of the automated fiber placement assembly 150, such as locally by a user, or remotely via a remote communication device, as well as electronically communicate with the cutter head assembly 160, or other elements such as the vacuum 164, the actuator 172, the roller 156, or a combination thereof.

Figure 4:
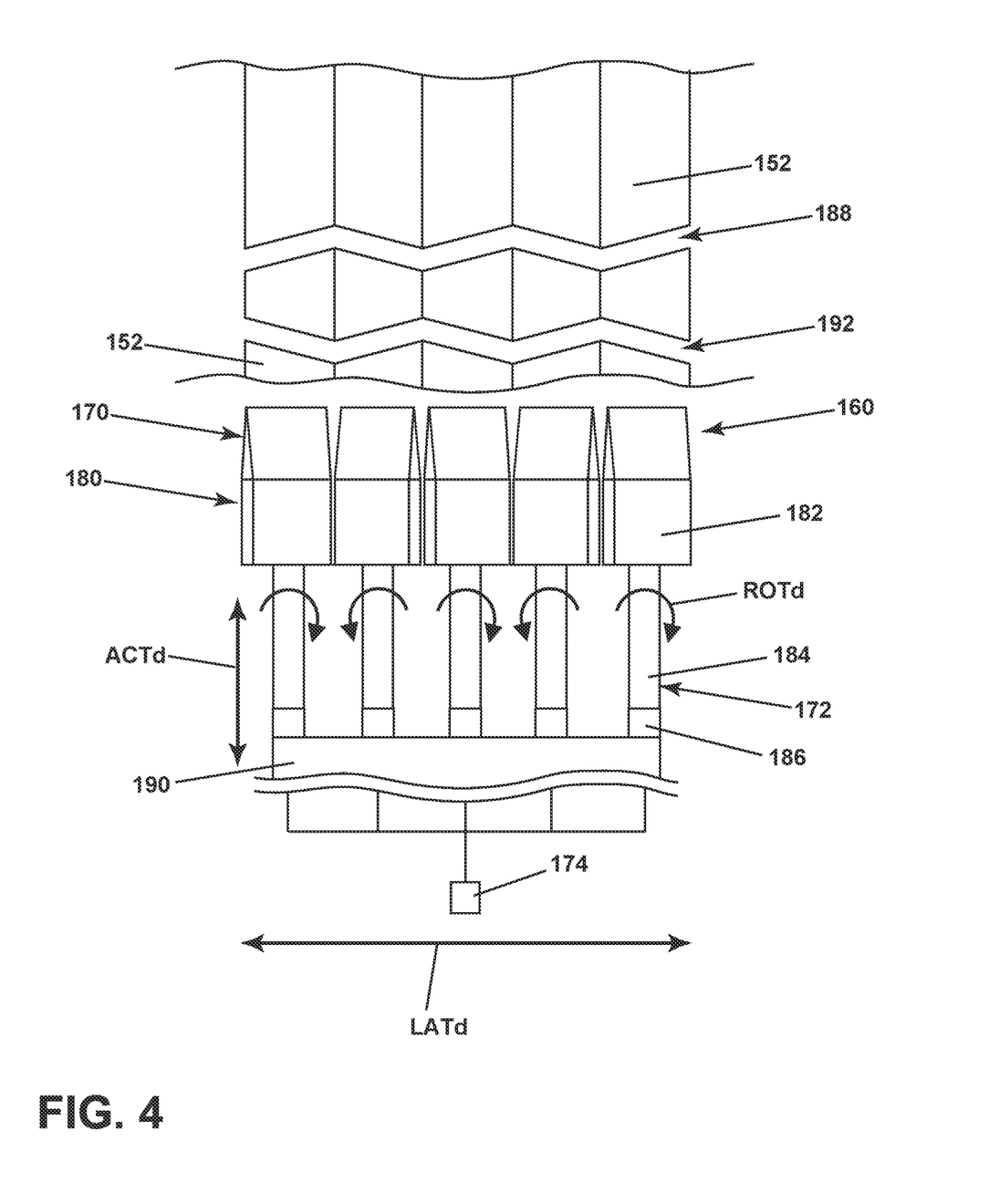
FIG. 4 is an enlarged schematic view of the cutter head assembly of FIG. 3, including a set of cutter heads, in accordance with an exemplary aspect of the present disclosure.

Referring to FIG. 4, the cutter head assembly 160 of FIG. 3 is provided in greater detail, with the cutter head 170 provided as a set of at least two cutter heads, illustrated as a set of cutter heads 180 including five exemplary cutter heads 182 arranged along the strip of fiber tows 152, where individual cutter heads 182 can be arranged complementary to individual tows of the strip of fiber tows 152. In alternate examples, any number of cutter heads 182 is contemplated, including one or more, such as at least two cutter heads 182 or a set of multiple cutter heads 182.

Each cutter head 182 can couple to a dedicated actuator 184, collectively defining the actuator 172, and permitting independent movement, rotation, operation, or actuation of each cutter head 182, as well as independent, partial, or collective movement among the set of cutter heads 180. That is, each of the cutter heads 182 can be independently operable or movable relative to one another via the respective dedicated actuator 184.

Furthermore, each dedicated actuator 184 can move in a rotating direction ROTd, an actuating direction ACTd, or a lateral direction LATd, as well as combinations thereof. A mount 186 couples the dedicated actuators 184 to a base 190. In one non-limiting example, the mount 186 can permit movement as rotation of each of the cutter heads 182 in the rotating direction ROTd via the actuators 184. More specifically, the mount 186 can include a motor or drive system, or other movement system, in order to permit movement of the mount relative to or along the base 190, as well as permitting rotational movement of the dedicated actuator 184, and even actuation thereof. In another non-limiting example, the mount 186 can move along the base 190 in the lateral direction LATd, such as with a drive system (not shown). In yet another non-limiting example, it is contemplated that the mount 186 can permit or drive actuation of the dedicated actuators 184, which can be done individually, collectively, or with actuation of less than all of the cutter heads 182, in non-limiting examples. Therefore, with each cutter head 182 being able to move individually, the creation of different or complex cut shapes or cut patterns for the ends of the strip of fiber tows 152, such as a first cut shape shown as a first zigzag cut pattern 188 or a second cut shape shown as a second zigzag cut pattern 192, as seen in FIG. 4. Such individual control of the cutter heads 182 permits forming or creating a plurality of different or complex cut shapes, without the changing one or more cutter heads 182, the actuator 172, or the entire cutter head assembly 160.

As can be appreciated in FIG. 4, the set of cutter heads 180 can define the first cut shape as the first zigzag cut pattern 188 and the second cut shape as the second zigzag cut pattern 192, with the second cut shape being different than the first cut shape. More specifically, the first cut shape is a mirrored version of the second cut shape, thereby defining the difference among the first and second cut shapes, while other suitable differences among the first cut shape and the second cut shape will be appreciated herein. In order to achieve each of the first cut shape and the second cut shape, the cutter heads 182 are rotated to be rotationally offset relative to adjacent cutter heads 182, thereby defining the first and second zigzag cut patterns 188, 192. While the cutter heads 182 are shown having a gap or spacing at the tips, which is not reflected in the first and second zigzag cut patterns 188, 192, it should be appreciated that this gap or spacing is to facilitate understanding only, so that the reader can visually appreciate the varied rotational orientation for each cutter head 182 relative to the next. Similarly, there is a gap illustrated between cut portions of the strip of fiber tows 152 at the first zigzag cut pattern 188 and the second zigzag cut pattern 192, which should be understood as being for visual understanding of the cut strip of fiber tows 152, and that actual cutting operation may or may not include such a gap. It should be understood that the particular position or geometry of each of the cutter heads 182 can be arranged so there is no gap or spacing between adjacent cutter heads 182, resulting in a consistent cut pattern with no gaps or spacing in the cut strip of fiber tows 152. Such a spacing between adjacent cutter heads 182 can be varied (or eliminated) by movement of the dedicated actuator 184 or the mount 186 in the lateral direction LATd, in non-limiting examples.

In operation, the cutter head assembly 160 and the set of cutter heads 180 can be arranged to form a first cut shape, represented in the first zigzag cut pattern 188. The cutter head assembly 160 can be actuated, such as with the actuator 172, to cut the strip of fiber tows 152 at the first cut shape as the first zigzag cut pattern 188. The set of cutter heads 180, or individual cutter heads 182 thereof, can be moved relative to their position defining the first cut shape, thereby defining a second cut shape different than the first cut shape. Such moving can include, in non-limiting examples, rotating in the rotating direction ROTd, or moving in the actuating direction ACTd or the lateral direction LATd, while additional movement can include pivoting, sliding, translating, or any other change in position different than that represented in the first cut shape. Movement of the set of cutter heads 180, or individual cutter heads 182, defines the second cut shape. The cutter head assembly 160 can be actuated again, cutting the strip of fiber tows 152 at the second shape. In this way, the cutter head assembly 160 is capable of making cuts in the strip of fiber tows 152 formed at a plurality of different cut shapes, without requiring changing or replacing of the cutter head assembly 160. While the first cut shape and the second cut shape are shown as zigzag cut patterns 188, 192, it should be understood that any suitable shape or pattern can be used to form the first cut shape and the second cut shape, such as those shapes shown in FIG. 5, or other non-zigzag shapes or partial zigzag shapes.

It is contemplated that each of the individual cutter heads 182, dedicated actuators 184, mounts 186, base 190, or a combination thereof, can be operably coupled to the controller 174, such that individual control of movement of the cutter heads 182 is permitted. In this way, variation of the cutter heads 182, collectively controlled by the controller 174, can be used to define various cut shapes or cut patterns without changing the cutter head assembly 160. Additionally, the controller 174 can permit automation of changing between cut shapes, where such automation can be programmed into the controller 174, or can be made specific to the particular component being formed, or portion thereof. More specifically, the controller 174 can automate changing between the first cut shape and the second cut shape, as well as any additional cut shapes.

Figure 5:
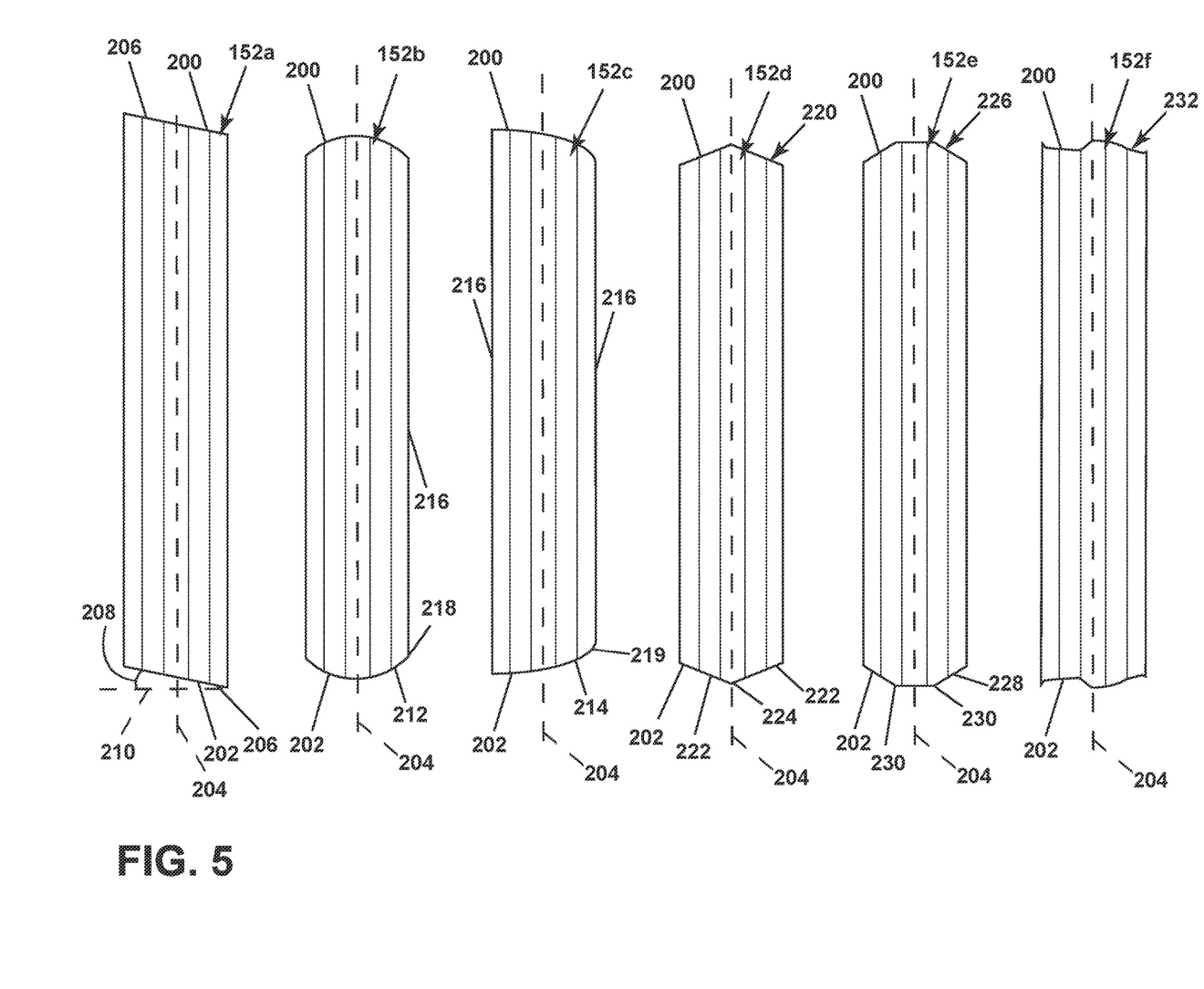
FIG. 5 includes multiple exemplary sets of fiber tows illustrating various cutting shapes within the capability of the cutter head assembly of FIGS. 3 and 4, in accordance with an exemplary aspect of the present disclosure.

Referring to FIG. 5, different exemplary strips of fiber tows 152 are shown, each being labeled as a strip of fiber tows 152a-152f, depicting different cut shapes or cut patterns which may be created via the cutter head assembly 160 of FIG. 4. Each strip of fiber tows 152a-152f has a first end 200 and an opposite second end 202, and has a longitudinal axis 204 extending between the first end 200 and the second end 202, which can be arranged parallel to the individual tows of the strip of fiber tows 152.

A first fiber tow strip 152a can include an angled end 206 defining an angled cut shape. The angled end 206 can be arranged at an angle 208 relative to an axis 210 arranged perpendicular to the longitudinal axis 204 of the first fiber tow strip 152a. As shown, the angled end 206 is arranged at the angle 208 offset from perpendicular to the longitudinal axis 204. The angle 208 can extend from one degree to eighty-nine degrees, or ninety-one degrees to one-hundred-seventy-nine degrees (1°-89° or 91°-179°) in one non-limiting example, where 90 degrees (90°) is parallel to the longitudinal axis 204. In one alternative example, the angled end 206 can be arranged perpendicular to the longitudinal axis 204 or non-orthogonal to the longitudinal axis 204.

A second fiber tow strip 152b can include a curved end 212 defining a curved cut shape. The curved end 212 can include a consistent curvature, such that the curvature defining the curved end 212 includes a constant radius of curvature, or shares a common center point. In one example, the curved end 212 can be parabolic, defining a parabolic end or parabolic cut shape, having a parabolic curvature at least partially defining a parabola. In another non-limiting example, the curved end 212 can include either an increasing or decreasing radius of curvature. A third fiber tow strip 152c illustrates an alternative curved end 214 defining another curved cut shape. The alternative curved end 214 can include an oval curvature or an elliptical curvature, which can at least partially define an oval or ellipse shape, which can define an ovoid end, an ovoid cut shape, an elliptical end, or an elliptical cut shape. In non-limiting embodiments, it is contemplated that a tow can be cut at a cut shape that includes a curved end that is parabolic, hyperbolic, elliptical, circular, oval, or that follows square, exponential, or logarithmic curvatures, or other curvatures, or combinations thereof. As can be appreciated, the curvature defined by the curved end 214 or curved cut shape can include a local radius of curvature that aligns with the edges 216 of the third fiber tow strip 152c, formed as a rounded edge 219.

A fourth fiber tow strip 152d can include a triangular end 220, or a triangular cut shape, having a pointed end with a point 224, and including two linear portions 222 connecting at the point 224. In additional non-limiting examples, the triangular end 220 or triangular cut shape can include symmetric or non-symmetric arrangements, where a symmetric arrangement can be defined along the longitudinal axis 204 extending through the point 224. More specifically, the angle or orientation at which each linear portion 222 is arranged can be complementary to or independent of the other linear portion 222. In another non-limiting example, it is contemplated that the point 224 is curved or rounded. A fifth fiber tow strip 152e can include a trapezoidal end 226 defining a trapezoidal cut shape, defining three sides of a trapezoidal shape. The trapezoidal end 226 includes three linear portions 228 which define the three sides of the trapezoid, intersecting at points 230. In alternate examples, any number of linear portions 228 or linear portions 222 are contemplated, in any angled, perpendicular, or non-angled arrangement, relative to the longitudinal axis 204, linear portions 228, or other linear portion 222 for the fifth fiber tow strip 152e, or individual tows thereof. The points 224, 230 defined where the linear portions 222 or linear portions 228 meet, can be rounded or pointed, in non-limiting examples.

While the fourth fiber tow strip 152d and the fifth fiber tow strip 152e are shown as triangular and trapezoidal cut shapes, any geometry is contemplated in defining a cut shape. Non-limiting examples of additional geometries include squared, triangular, rectangular, trapezoidal, circular, hexagonal, or combinations thereof.

A sixth fiber tow strip 152*f* can include a combination end 232, or a combination cut shape, which can include a combination of ends or cut shapes, such as a combination of linear and curved cut shapes, or cut shapes that do not match a linear or curved profile. In one non-limiting example, the combination end 232 or combination cut shape can be tailored to or complementary to the shape of the component 154 (FIG. 3) being formed, where such a geometry is outside of standard curved, linear, or geometric cut shapes.

It should be understood that the set of cutter heads 180 of FIG. 4 can be used to create a plurality of different cut shapes or cut patterns, such as the examples illustrated in FIG. 5. In this way, accurate cut shapes can be achieved, which can decrease waste, as well as material costs, and manufacturing costs and time. The ability to specifically or determinatively cut the strip of fiber tows 152 during application can permit forming complex shape or patterns, which is not otherwise possible without detailed finishing of the component.

Figure 6:
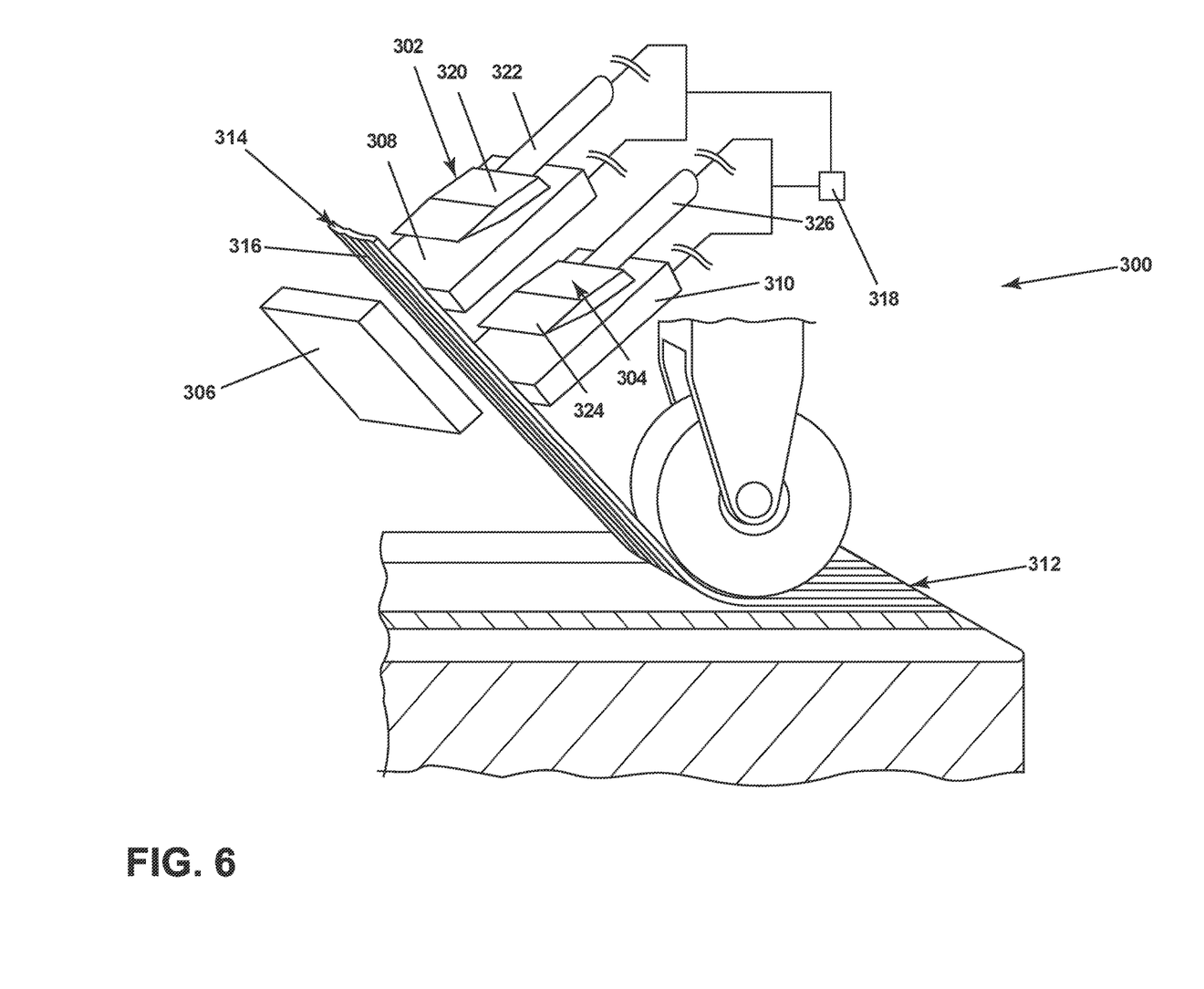
FIG. 6 is schematic perspective view of another automated fiber placement assembly with two cutter head assemblies configured to cut opposing ends of a fiber tow, in accordance with an exemplary aspect of the present disclosure.

FIG. 6 illustrates another exemplary automated fiber placement assembly 300 that includes a first cutter head assembly 302 and a second cutter head assembly 304 spaced from the first cutter head assembly 302. A backplate 306 is positioned behind the first and second cutter head assemblies 302, 304, while a dedicated backplate for each of the first and second cutter head assemblies 302, 304 is contemplated. A strip of fiber tows 316 are provided between the backplate 306 and the first and second cutter head assemblies 302, 304. A first vacuum 308 is provided at the first cutter head assembly 302 and a second vacuum 310 is provided at the second cutter head assembly 304, while a single or unitary vacuum system for the automated fiber placement assembly 300 is contemplated. The first cutter head assembly 302 further includes a cutter head 320, coupled to an actuator 322 that actuates the cutter head 320 to cut the strip of fiber tows 316 against the backplate 306. The second cutter head assembly 304 further includes a cutter head 324, coupled to an actuator 326 that actuates the cutter head 324 to cut the strip of fiber tows 316 against the backplate 306. Alternatively, each of the first cutter head assembly 302 and the second cutter head assembly 304 can include a set of cutter heads, such as the set of cutter heads 180 of FIG. 4, to permit multiple different cut shapes or cut patterns.

The cutter head assemblies 302, 304 can be automated or programmable cutting tools, operably coupled to a controller 318 programmable to cut complex shapes or patterns into the strip of fiber tows 316The automated fiber placement assembly 300, utilizing the first and second cutter head assemblies 302, 304, permits the cutting of the strip of fiber tows 316 at both a first end 312 and a second end 314, respectively, without changing the cutter for the second end 314.

In this way, it should be appreciated that complex cut shapes or cut patterns at either of the first and second ends 312, 314 of the strip of fiber tows 316 can be achieved with a two-cutter system of the first and second cutter head assemblies 302, 304, reducing or eliminating changing of the cutter heads 320, 324 in order to achieve different cut shapes or cut patterns at either of the first and second ends 312, 314. While utilizing a set of cutter heads, such as the set of cutter heads 180 of FIG. 4, can permit multiple different cut shapes or cut patterns, there may be patterns that are not achievable with a single cutter head assembly alone, despite the capability of changing among a first cut shape and a different second cut shape. Utilizing both the first and second cutter head assemblies 302, 304 can achieve a wider array of cut shapes or cut patterns as compared to that of single cutter head alone, and reduces or eliminates changing of the cutter heads during operation.

Figure 7:
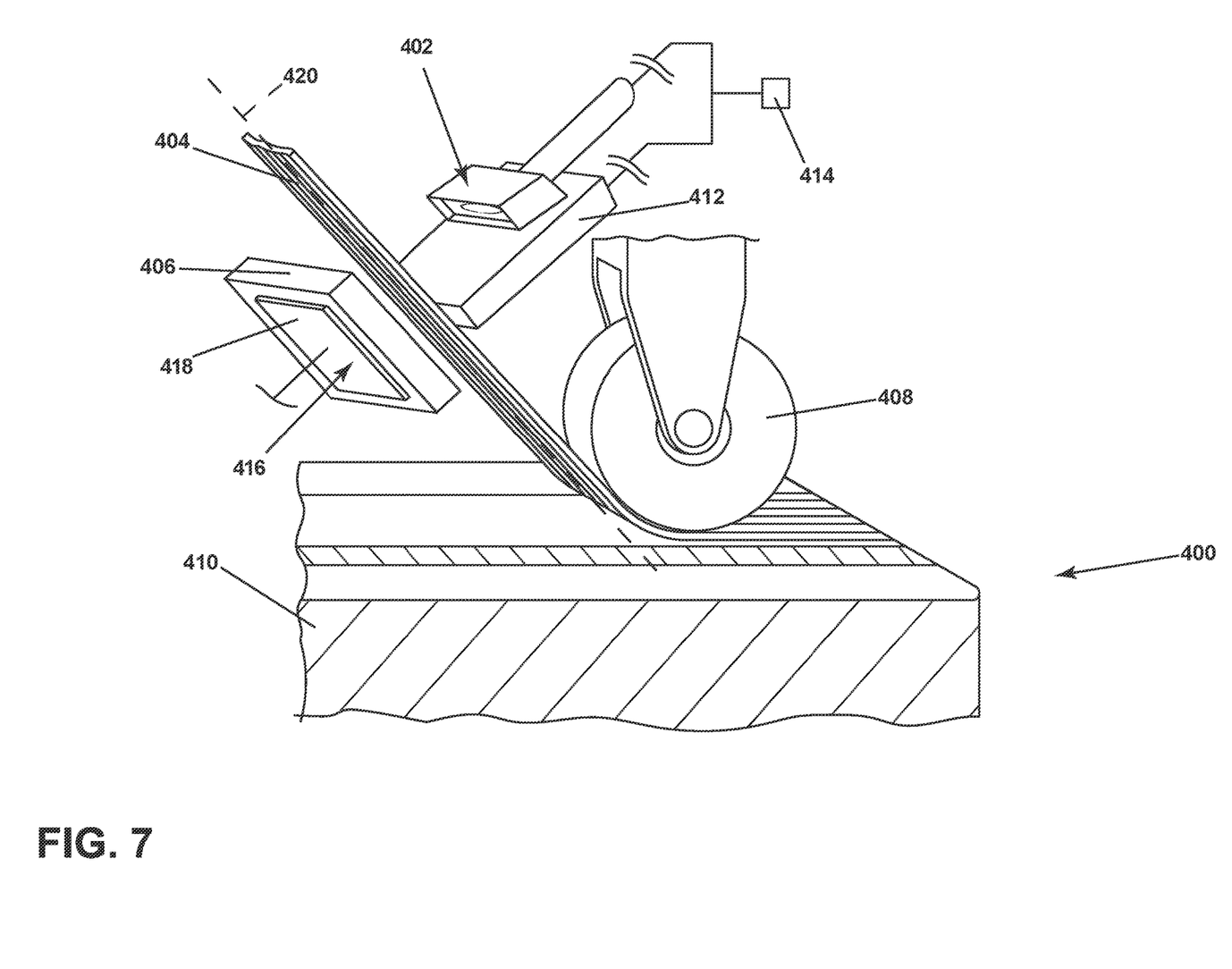
FIG. 7 is a schematic perspective view of yet another automated fiber placement assembly with a laser cutter assembly, in accordance with an exemplary aspect of the present disclosure.

Referring to FIG. 7, another exemplary automated fiber placement assembly 400 includes a cutter head assembly 402 for cutting a strip of fiber tows 404 against a backplate 406. Similar to that discussed above, the automated fiber placement assembly 400 can include a roller 408 for rolling the strip of fiber tows 404 along a component 410. A vacuum 412 can be positioned near, at, or adjacent to the cutter head assembly 402 to remove cuttings from the strip of fiber tows 404.

The cutter head assembly 402 can be an automated or programmable cutting tool, operably coupled to a controller 414 programmable to cut the strip of fiber tows 404 into different cut shapes, including complex shapes or patterns at either or both ends, at any position along the strip of fiber tows 404, or a combination thereof. In one non-limiting example, the cutter head assembly 402 can be a laser cutter which can be programmed to cut specific cut shapes or cut patterns into the strip of fiber tows 404, or the individual tows thereof. In another non-limiting example, the cutter head assembly 402 can be a knife-type cutter, such as a vibrating knife that translates across the strip of fiber tows 404 in directions parallel to and perpendicular to a longitudinal axis 420, defined along the strip of fiber tows 404, to create any profile, cut pattern, or cut shape for the ends of the strip of fiber tows 404, or even along any portion of the strip of fiber tows 404.

The backplate 406 can optionally be a cooled backplate, with the backplate 406 being actively cooled by a cooling system 416. One non-limiting example of the cooling system 416 can include a heat exchanger 418 coupled to the backplate 406. Utilizing the cutter head assembly 402, such as a laser cutter, can generate heat. The strip of fiber tows 404 can be treated, such as with a resin, which can be activated by the addition of heat. Therefore, in order to inhibit premature activation, the strip of fiber tows 404 can be actively cooled by the backplate 406 in order to ensure proper or timely activation of resins or materials within the strip of fiber tows 404.

Figure 8:
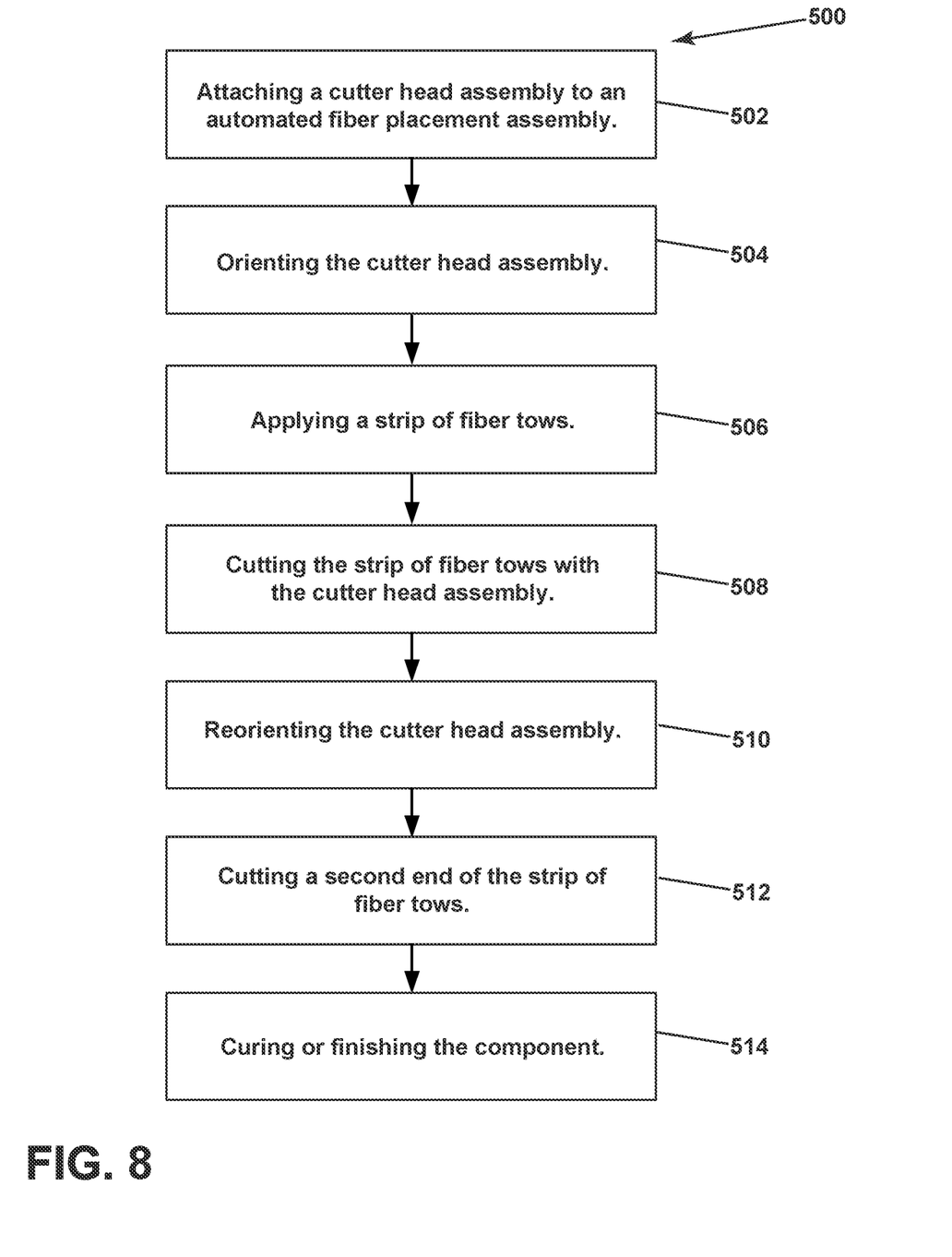
FIG. 8 illustrates a flow chart depicting a method of forming a component for a turbine engine, in accordance with an exemplary aspect of the present disclosure.

FIG. 8 shows a flow chart depicting a method 500 of forming a component, such as for a turbine engine, like the turbine engine 10 of FIG. 1 and the component 154, 410 of FIGS. 3 and 7. At 502, the method 500 can include attaching a cutter head assembly, such as the cutter head assemblies 160, 302, 304, 402 to an automated fiber placement assembly, such has the automated fiber placement assemblies 150, 300, 400. Attachment of a particular cutter head assembly 160, 302, 304, 402 can be determined based upon the particular component 154, 410 being prepared, and the cutter head assembly 160, 302, 304, 402 can be prearranged or preoriented at a particular first cut shape or cut pattern for the strip of fiber tows 152, 316, 404 to be cut.

At 504, the method 500 can include orienting the cutter head assembly 160, 302, 304, 402. Orienting the cutter head assembly 160, 302, 304, 402 can be achieved by rotating cutter heads, such as the cutter heads 170, 182, 320, 324 with the mount 186, for example. For example, where the cutter head assembly 160, 302, 304, 402 is not prearranged or preoriented at the first cut shape, the method 500 can including moving the cutter head assembly 160, 302, 304, 402, or the cutter heads 170, 182, 320, 324 thereof, to the first cut shape. Orienting the cutter head assembly 160, 302, 304, 402 can include rotating the entire cutter head assembly 160, 302, 304, 402, or rotating one or more individual cutter heads 170, 182, 320, 324 of the cutter head assembly 160, 302, 304, 402, such as the cutter heads 170, 182, 320, 324 in order to define the first cut shape or cut pattern. Additionally, orienting can include moving, translating, shifting, rotating, pivoting, retracting, extending, or a combination thereof, such as in one or more of the rotating direction ROTd, the actuating direction ACTd, or the lateral direction LATd, the cutter heads 170, 182, 320, 324 or the actuator 172, in order to orient the cutter head assembly 160, 302, 304, 402 to the first cut shape or cut pattern.

At 506, the method 500 can include applying the strip of fiber tows 152, 316, 404, to the component 154, 410 or to form the component 154, 410, such as the composite airfoil 100, the body 104 thereof. In a non-limiting example, application of the strip of fiber tows 152, 316, 404 can be applied in a feed direction by a roller, such as the roller 156, 408 described herein. The feed direction can be aligned with the longitudinal extent to the strip of fiber tows 152, 316, 404, while angled or offset application is contemplated. Control of the application speed, as well as starting or stopping the feed, can be achieved with the roller, for example, which can be controlled with a controller, such as the controller 174, 318, 414. In another non-limiting example, the strip of fiber tows 152 can be applied to a substrate. The substrate can be previous layers of strips of fiber tows 152, 316, 404, the component 154, 410, or a mandrel, in non-limiting examples. In this way, application of the strip of fiber tows 152, 316, 404 can be defined by any application during formation of the component 154, 410, such as onto a previous layer of fiber tows or directly onto a mandrel or other feature for forming the component 154, 410.

At 508, the method 500 can include cutting at least one fiber tow of the strip of fiber tows 152, 316, 404, with the cutter head assembly 160, 302, 304, 402 at the first cut shape. In one non-limiting example, cutting can include actuating the cutter head assembly 160, 302, 304, 402 with the actuator such that the cutter head 170, 182, 320, 324 severs at least one fiber tow of the strip of fiber tows 152, 316, 404. Such cutting can be achieved by actuation of the cutter head assembly 160, 302, 304, 402 until the cutter head 170, 182, 320, 324 contacts a backplate, such as the backplate 162, 306, 406, to ensure that severance has been achieved. In another non-limiting example, cutting can be achieved with a laser cutter using a laser to sever the strip of fiber tows 152, 316, 404 at the first cut shape or cut pattern. In yet another non-limiting example, cutting can be achieved with a vibrating cutter, which translates across the strip of fiber tows 152, 316, 404 in a predetermined path or pattern in order to achieve the first cut shape or cut pattern.

At 510, the method 500 can include reorienting the cutter head assembly 160, 302, 304, 402, which can include moving the cutter head assembly 160, 302, 304, 402, or the cutter heads 170, 182, 320, 324 thereof, from the first cut shape to a second cut shape different than the first cut shape. Reorienting can include, in a non-limiting example, moving, translating, shifting, rotating, pivoting, retracting, extending, or a combination thereof, such as in one or more of the rotating direction ROTd, the actuating direction ACTd, or the lateral direction LATd, to define a second cut shape or cut pattern that is different than the first cut shape or cut pattern. Reorienting the cutter head assembly 160, 302, 304, 402 when the cutter is a laser cutter or a vibrating cutter can include programming a new or different cut shape or cut pattern, such as with the controller 174, 318, 414 operably or communicatively coupled to the cutter head assembly 160, 302, 304, 402.

At 512, the method 500 can include cutting a second end at the second cut shape, such as the second end 202, 314 of the strip of fiber tows 152, 316, 404, or individual tows thereof. Additionally, it is further contemplated that the cutter head assembly 160, 302, 304, 402 can cut intermediate portions of the strip of fiber tows 152, 316, 404 at the second cut shape, including any portion or position between the first end 200, 312 and the second end 202, 314, in order to create different cut shapes or cut patterns along the length of the strip of fiber tows 152, 316, 404. In such an example, it is contemplated that the cutter head assembly 160, 302, 304, 402 can be reoriented to a third cut shape, different than the first cut shape and the second cut shape, in order to cut the intermediate portions of the strip of fiber tows 152, 316, 404, and then reoriented again to the second cut shape to cut the second end 202, 314. In such a situation, the cutter head assembly 160, 302, 304, 402 can be oriented to the first cut shape to cut the first end 200, 312, move to be oriented at the third cut shape to cut an intermediate portion of the strip of fiber tows 152, 316, 404, and then move to be oriented at the second cut shape to cut the second end 202, 314, without requiring movement to the second cut shape prior to movement to the third cut shape.

At 514, the method 500 can include curing or finishing the component 154, 410. In one non-limiting example, curing the component 154, 410 can include cooling the component 154, 410, such as with a heat exchanger 418. In another non-limiting example, the component 154, 410 can be finished by applying exterior materials or coatings, such as an exterior barrier or paint coating, while additional finishing processes or actions are within the scope of this disclosure.

The aspects described herein provide a process or method 500 of forming a component 154, 410, such as the composite airfoil 100, or a portion thereof. The cutter head assembly 160, 302, 304, 402 provides for creating complex cut shapes and cut patterns, which reduces waste and finishing, which reduces time and cost. Additionally, it should be appreciated that the method 500 should not be limited as depicted in FIG. 8, and it is within the scope of this disclosure that the aspects of the method 500 as shown may be rearranged, repeated, or removed in order to define different methods among a plurality of methods.

The benefits associated with utilizing a cutter head assembly for an automated fiber placement assembly, or a method, as described herein, provide for improved shaping and accuracy for the fibers being applied during the formation of a component. Such improved cutting provides for reduced waste and finishing, which reduces costs and manufacture time. Utilizing a cutter head assembly with multiple movable cutter heads permits the creation of complex shapes for applied fibers, providing for improved shaping and accuracy, which further decreases cost and time. Further, the automated fiber placement assembly permits utilizing different cutting shapes, which reduces or eliminates changing of the cutter heads during manufacture, while a dedicated vacuum reduces separate cleaning of waste trimmings.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An automated fiber placement assembly for forming a component with a strip of fiber tows defining a longitudinal axis, the automated fiber placement assembly comprising: a first cutter head assembly defining a first cut shape and movable to define a second cut shape different than the first cut shape.

The automated fiber placement assembly of any preceding clause wherein at least a portion of one of the first cut shape or the second cut shape is arranged non-orthogonal to the longitudinal axis.

The automated fiber placement assembly of any preceding clause wherein the first cutter head assembly comprises a set of at least two cutter heads wherein each cutter head of the set of at least two cutter heads is movable independent of the other cutter heads of the set of at least two cutter heads.

The automated fiber placement assembly of any preceding clause wherein each cutter head of the at least two cutter heads is movable to cut at least a portion of the strip of fiber tows non-orthogonal to the longitudinal axis.

The automated fiber placement assembly of any preceding clause wherein the first cutter head assembly comprises at least two cutter heads, and wherein the at least two cutter heads are movable to collectively define the first cut shape and the second cut shape.

The automated fiber placement assembly of any preceding clause wherein the first cut shape defined by the at least two cutter heads is one of an angled cut shape, a curved cut shape, a triangular cut shape, a trapezoidal cut shape, or a combination cut shape.

The automated fiber placement assembly of any preceding clause further comprising a second cutter head assembly, wherein the second cutter head assembly is movable to cut a third cut shape different than at least one of the first cut shape and the second cut shape.

The automated fiber placement assembly of any preceding clause further comprising a vacuum positioned adjacent to the first cutter head assembly.

The automated fiber placement assembly of any preceding clause wherein the first cutter head assembly comprises a cutter head removably attached to the first cutter head assembly.

The automated fiber placement assembly of any preceding clause further comprising a backplate spaced from the first cutter head assembly.

The automated fiber placement assembly of any preceding clause further comprising a cooling system operably coupled to the backplate.

The automated fiber placement assembly of any preceding clause wherein the component is a gas turbine engine component.

The automated fiber placement assembly of any preceding clause wherein at least one of the first cut shape or the second cut shape defines a curved shape with a varying radius of curvature.

The automated fiber placement assembly of any preceding clause wherein at least one of the first cut shape or the second cut shape defines a parabolic curvature.

The automated fiber placement assembly of any preceding clause wherein at least one of the first cut shape or the second cut shape defines an ovoid curvature.

The automated fiber placement assembly of any preceding clause wherein at least one of the first cut shape or the second cut shape defines an elliptical curvature.

The automated fiber placement assembly of any preceding clause wherein at least one of the first cut shape or the second cut shape defines a combination curvature.

An automated fiber placement assembly for forming a component with a strip of fiber tows defining a longitudinal axis, the automated fiber placement assembly comprising: a first cutter head assembly including a cutter head defining a first cut shape; wherein the cutter head is movable from the cut first shape to a second cut shape.

The automated fiber placement assembly of any preceding clause wherein the first cutter head assembly comprises a set of at least two cutter heads wherein each cutter head of the set of at least two cutter heads is movable independent of the other cutter heads of the set of at least two cutter heads.

The automated fiber placement assembly of any preceding clause further comprising a set of at least two vacuums, with one vacuum of the set of at least two vacuum positioned at each cutter head of the set of at least two cutter heads.

The automated fiber placement assembly of any preceding clause further comprising a set of at least two actuators, with one actuator of the set of at least two actuators positioned at each cutter head of the set of at least two cutter heads.

The automated fiber placement assembly of any preceding clause wherein the first cutter head assembly is a laser cutter movable in directions parallel to and perpendicular to the longitudinal axis.

The automated fiber placement assembly of any preceding clause wherein the first cutter head assembly comprises a vibrating knife that translates across the strip of fiber tows in directions parallel to and perpendicular to the longitudinal axis.

The automated fiber placement assembly of any preceding clause wherein the component is a gas turbine engine component.

A method of forming a component, the method comprising: applying a strip of fiber tows to a substrate in a feed direction; cutting the strip of fiber tows with a cutter head assembly to define a first cut shape; and moving the cutter head assembly to define a second cut shape different than the first cut shape.

The method of any preceding clause wherein at least a portion of the first cut shape or the second cut shape is non-orthogonal to the feed direction.

The method of any preceding clause wherein the cutter head assembly includes a set of multiple cutter heads; and wherein moving the cutter head assembly further comprises moving at least one cutter head of the set of multiple cutter heads to change the first cut shape to the second cut shape.

The method of any preceding clause further comprising cutting the strip of fiber tows with the cutter head assembly defining the second cut shape.

The method of any preceding clause wherein moving the cutter head assembly further comprises reorienting the cutter head assembly to define the second cut shape.

What is claimed is:

1. An automated fiber placement assembly for forming a component with a strip of fiber tows defining a longitudinal axis, the automated fiber placement assembly comprising:
   a first cutter head assembly defining a first cut shape and movable to define a second cut shape different than the first cut shape.

2. The automated fiber placement assembly of claim 1, wherein at least a portion of one of the first cut shape or the second cut shape is arranged non-orthogonal to the longitudinal axis.

3. The automated fiber placement assembly of claim 1, wherein the first cutter head assembly comprises a set of at least two cutter heads wherein each cutter head of the set of at least two cutter heads is movable independent of the other cutter heads of the set of at least two cutter heads.

4. The automated fiber placement assembly of claim 3, wherein each cutter head of the set of at least two cutter heads is movable to cut at least a portion of the strip of fiber tows non-orthogonal to the longitudinal axis.

5. The automated fiber placement assembly of claim 1, wherein the first cutter head assembly comprises at least two cutter heads, and wherein the at least two cutter heads are movable to collectively define the first cut shape and the second cut shape.

6. The automated fiber placement assembly of claim 5, wherein the first cut shape defined by the at least two cutter heads is one of an angled cut shape, a curved cut shape, a triangular cut shape, a trapezoidal cut shape, or a combination cut shape.

7. The automated fiber placement assembly of claim 1, further comprising a second cutter head assembly, wherein the second cutter head assembly is movable to cut a third cut shape different than at least one of the first cut shape and the second cut shape.

8. The automated fiber placement assembly of claim 1, further comprising a vacuum positioned adjacent to the first cutter head assembly.

9. The automated fiber placement assembly of claim 1, wherein the first cutter head assembly comprises a cutter head removably attached to the first cutter head assembly.

10. The automated fiber placement assembly of claim 1, further comprising a backplate spaced from the first cutter head assembly.

11. The automated fiber placement assembly of claim 10, further comprising a cooling system operably coupled to the backplate.

12. An automated fiber placement assembly for forming a component with a strip of fiber tows defining a longitudinal axis, the automated fiber placement assembly comprising:
a first cutter head assembly including a cutter head defining a first cut shape;
wherein the cutter head is movable from the cut first shape to a second cut shape.

13. The automated fiber placement assembly of claim 12, wherein the first cutter head assembly comprises a set of at least two cutter heads wherein each cutter head of the set of at least two cutter heads is movable independent of the other cutter heads of the set of at least two cutter heads.

14. The automated fiber placement assembly of claim 12, wherein the first cutter head assembly is a laser cutter movable in directions parallel to and perpendicular to the longitudinal axis.

15. The automated fiber placement assembly of claim 12, wherein the first cutter head assembly comprises a vibrating knife that translates across the strip of fiber tows in directions parallel to and perpendicular to the longitudinal axis.

16. A method of forming a component, the method comprising:
applying a strip of fiber tows to a substrate in a feed direction;
cutting the strip of fiber tows with a cutter head assembly to define a first cut shape; and
moving the cutter head assembly to define a second cut shape different than the first cut shape.

17. The method of claim 16, wherein at least a portion of the first cut shape or the second cut shape is non-orthogonal to the feed direction.

18. The method of claim 16, wherein the cutter head assembly includes a set of multiple cutter heads; and wherein moving the cutter head assembly further comprises moving at least one cutter head of the set of multiple cutter heads to change the first cut shape to the second cut shape.

19. The method of claim 16, further comprising cutting the strip of fiber tows with the cutter head assembly defining the second cut shape.

20. The method of claim 17, wherein moving the cutter head assembly further comprises reorienting the cutter head assembly to define the second cut shape.

* * * * *